US011204774B1

(12) United States Patent
Goodman et al.

(10) Patent No.: US 11,204,774 B1
(45) Date of Patent: Dec. 21, 2021

(54) THREAD-GROUP-SCOPED GATE INSTRUCTION

(71) Applicant: Apple Inc., Cupertino, CA (US)

(72) Inventors: Benjiman L. Goodman, Cedar Park, TX (US); Anjana Rajendran, Austin, TX (US); Jeffrey A. Lohman, Maitland, FL (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/008,518

(22) Filed: Aug. 31, 2020

(51) Int. Cl.
*G06F 9/38* (2018.01)

(52) U.S. Cl.
CPC .......... G06F 9/3887 (2013.01); G06F 9/3851 (2013.01)

(58) Field of Classification Search
None
See application file for complete search history.

(56) References Cited

U.S. PATENT DOCUMENTS

| | | | | |
|---|---|---|---|---|
| 7,437,521 B1 * | 10/2008 | Scott | ................... | G06F 9/30087 711/151 |
| 7,788,468 B1 | 8/2010 | Nickolls et al. | | |
| 8,997,103 B2 | 3/2015 | Gadre et al. | | |
| 9,218,223 B2 * | 12/2015 | Gaster | ................... | G06F 9/3887 |
| 9,442,755 B2 * | 9/2016 | Lindholm | ................. | G06F 9/46 |
| 9,652,284 B2 * | 5/2017 | Mei | ......................... | G06F 9/522 |
| 9,652,300 B2 * | 5/2017 | Targowski | .............. | G06F 9/522 |
| 10,242,419 B2 | 3/2019 | Sathe | | |
| 10,521,875 B2 * | 12/2019 | Koker | ................... | G06F 9/5011 |
| 2007/0143755 A1 * | 6/2007 | Sahu | ..................... | G06F 9/3851 718/100 |
| 2015/0052537 A1 * | 2/2015 | Gaster | ..................... | G06F 9/522 718/106 |
| 2015/0205586 A1 * | 7/2015 | Diamos | ............... | G06F 11/3644 717/158 |

(Continued)

OTHER PUBLICATIONS

Gaster, B.R. et al., HRF-Relaxed: Adapting HRF to the Complexities of Industrial Heterogeneous Memory Models, 2015, ACM, ACM Trans. on Architecture and Code Optimization, vol. 12, No. 1, Article 7, p. 7:1-7:26. (Year: 2015).*

(Continued)

*Primary Examiner* — Eric Coleman
(74) *Attorney, Agent, or Firm* — Kowert, Hood, Munyon, Rankin & Goetzel, P.C.; Michael B. Davis

(57) ABSTRACT

Techniques are disclosed relating to a thread-group-scoped gate instruction. In some embodiments, graphics processor circuitry is configured to execute, for multiple SIMD groups of a thread group, a graphics program that includes a gate instruction. During execution of the gate instruction for a first SIMD group, the processor accesses state information to determine that a threshold number of other SIMD groups in the thread group have not yet executed the gate instruction. Based on the determination, the processor executes a particular set of instructions of the graphics program for the first SIMD group (that is not executed by one or more other SIMD groups that reach the gate instruction after the first SIMD group). For example, the particular set of instructions may be a utility program that performs one or more operations for the entire thread group but is only executed by a subset of the SIMD groups.

20 Claims, 7 Drawing Sheets

(56) References Cited

U.S. PATENT DOCUMENTS

2018/0307985 A1* 10/2018 Appu .................... G06N 3/063

OTHER PUBLICATIONS

Orr, M. S. et al., Synchronization Using Remote-Scope Promotion, 2015, ACM, pp. 73-86. (Year: 2015).*
Sorensen, T., et al., Portable Inter-workgroup Barrier Synchronization for GPUs, 2016, ACM, pp. 39-58. (Year: 2016).*
Lin, C., et al., Fence Scoping, 2014, IEEE., pp. 105-116. (Year: 2014).*

* cited by examiner

US 11,204,774 B1

THREAD-GROUP-SCOPED GATE INSTRUCTION

BACKGROUND

Technical Field

This disclosure relates generally to computer processors and more particularly to control transfer instructions in SIMD processors.

Description of the Related Art

Some computer processors execute instructions using single-instruction multiple-data (SIMD) techniques in which the same instruction is executed in parallel for multiple different threads. In graphics processing, for example, a thread group may include a large number of threads (e.g., hundreds) that execute the same program and the processor may form the threads into SIMD groups that operate on parallel hardware (e.g., groups of 16, 32, 64 threads—or any appropriate number—supported by parallel pipeline hardware). In the graphics context, SIMD groups may also be referred to as cliques, warps, or wavefronts, for example.

Threads may take different paths through a program due to control transfer instructions such as branches or jumps. Within a SIMD group, control transfer may be implemented using predicated execution in some architectures, e.g. where instructions from multiple paths of a branch are executed, but only instructions on the "taken" path for a given thread are allowed to update the architectural state. For example, for an eight-thread SIMD group, if threads 0-4 take a branch and threads 5-7 do not take a branch, the processor will only allow threads 0-4 to modify architectural state when executing the portion of the program corresponding to the taken branch. Threads 5-7 will be predicated off for this portion of the program.

Threads may use various instructions for synchronization among threads, SIMD groups, etc. For example, barrier instructions may specify that all threads (e.g., all threads in a thread group) must arrive at a barrier before execution continues past the barrier.

DETAILED DESCRIPTION

The following disclosure provides circuitry and techniques for executing a thread-group-scoped gate instruction. The inventors of the present application recognized that gate functionality among SIMD groups in a thread group may be advantageous in certain processing scenarios. Therefore, this disclosure sets out an example instruction definition and example circuitry to perform this functionality. Disclosed techniques may advantageously improve processing performance, reduce power consumption, or both, relative to traditional techniques.

A thread group may include a large number of threads that may be formed into multiple different SIMD groups for execution. In disclosed embodiments, when the first N SIMD groups reach the gate instruction, they execute a particular part of the graphics program that is not executed by other SIMD groups. Therefore, the gate instruction is an example of a conditional control transfer at SIMD group granularity. As one specific example, the first N SIMD groups may continue to execute code that follows the gate instruction in program order while the other SIMD groups may take a branch. The threads may later synchronize execution at a barrier instruction. In some embodiments, this allows the first N SIMD groups to execute a utility program or function for the thread group as a whole.

Figure 1A:
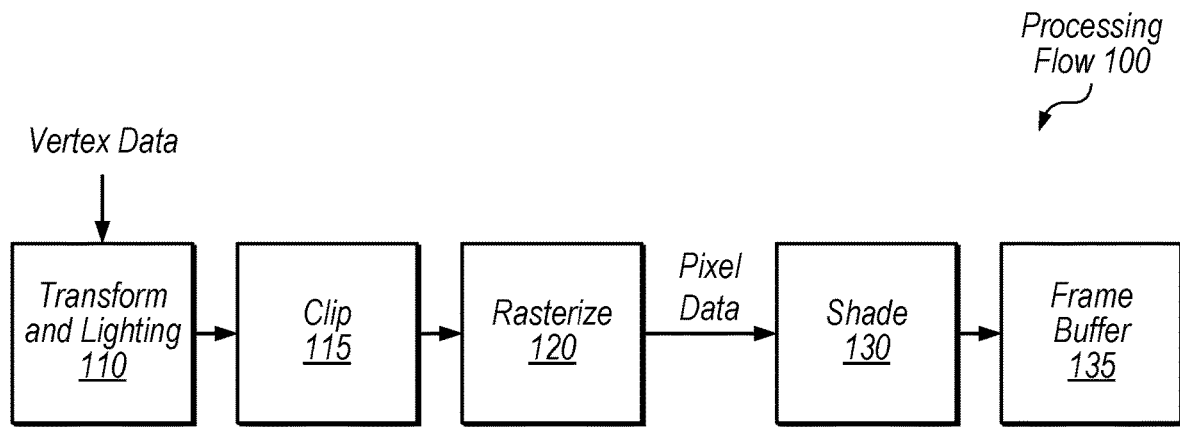
FIG. 1A is a diagram illustrating an overview of example graphics processing operations, according to some embodiments.
Figure 1B:
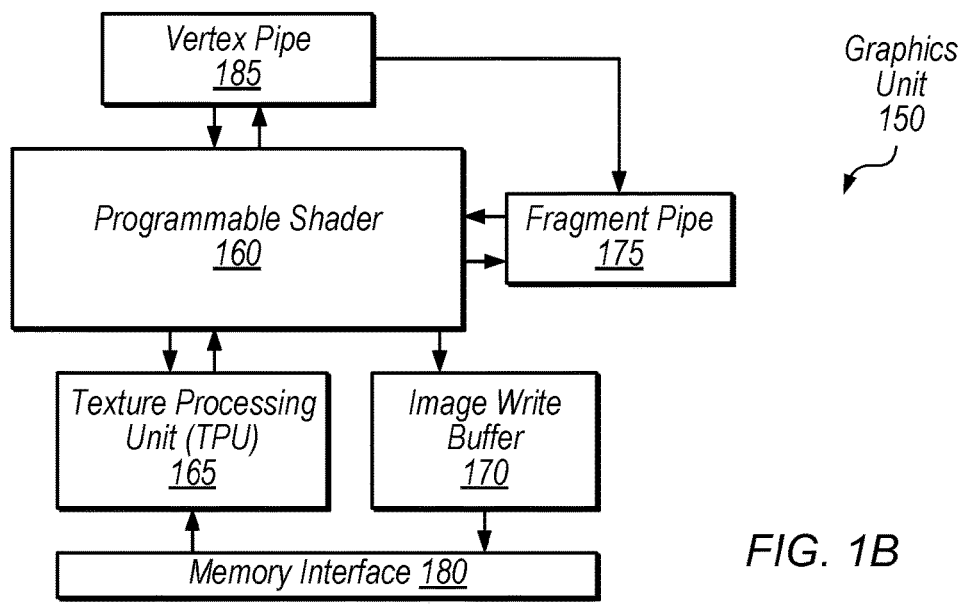
FIG. 1B is a block diagram illustrating an example graphics unit, according to some embodiments.
Figure 6:
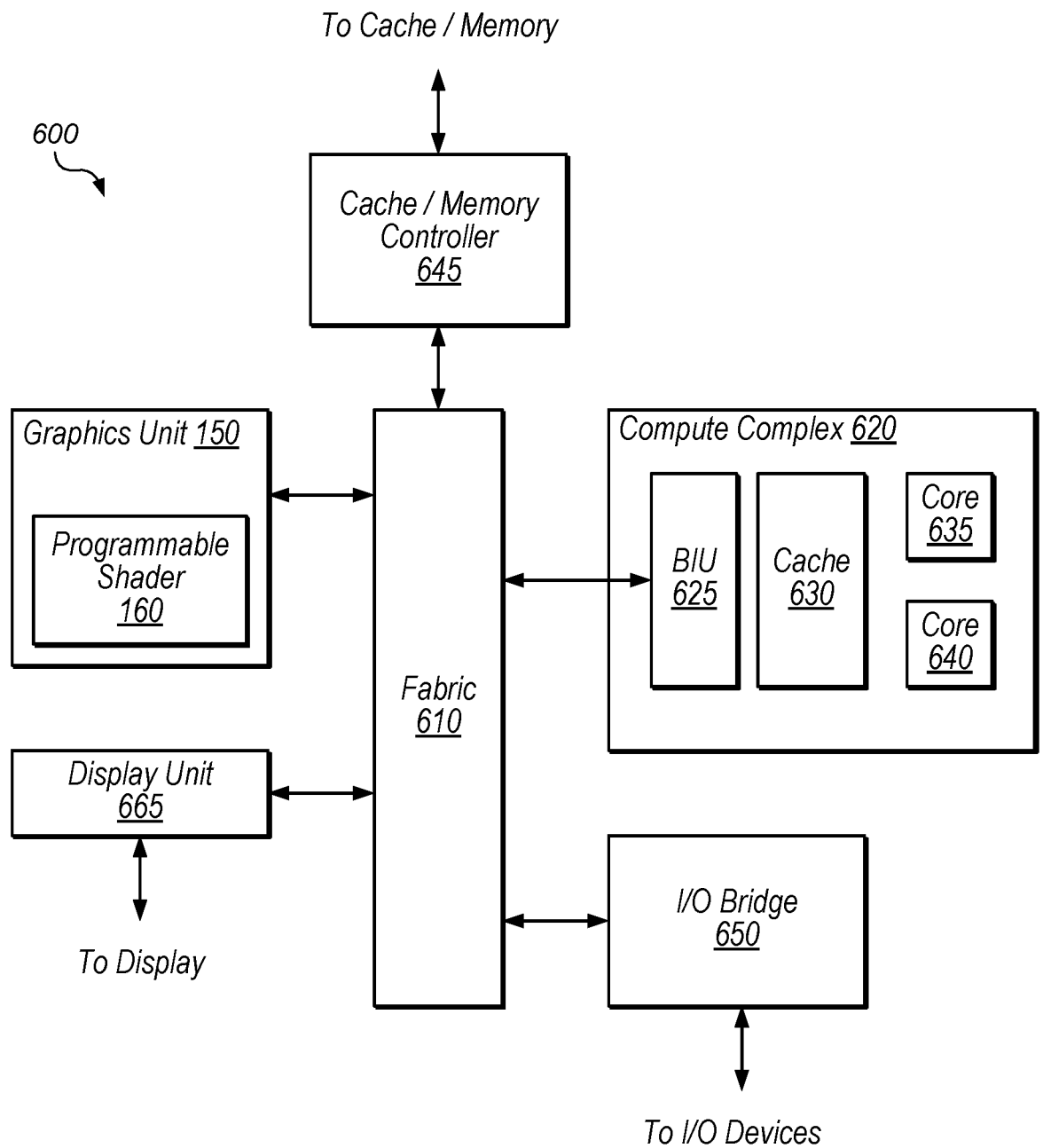
FIG. 6 is a block diagram illustrating an example computing device, according to some embodiments.
Figure 7:
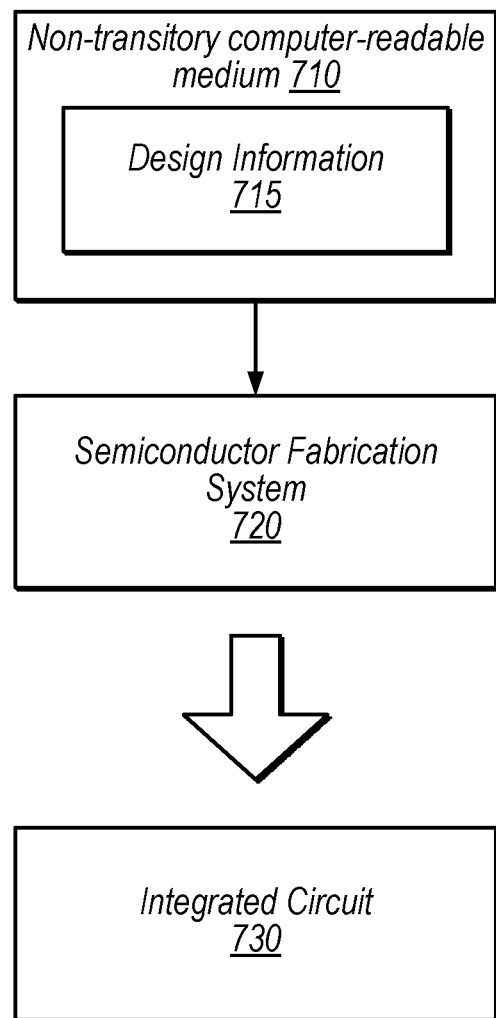
FIG. 7 is a block diagram illustrating an example computer-readable medium that stores circuit design information, according to some embodiments.

FIGS. 1A-1B provide an overview of graphics processing. FIGS. 2-5 show example techniques and circuitry associated with a thread-group-scoped gate instruction. FIG. 6 shows an example computing device and FIG. 7 shows an example computer-readable medium that stores design information.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Example Processor Circuitry that Supports Thread-Group-Scoped Gate Instruction

Figure 2:
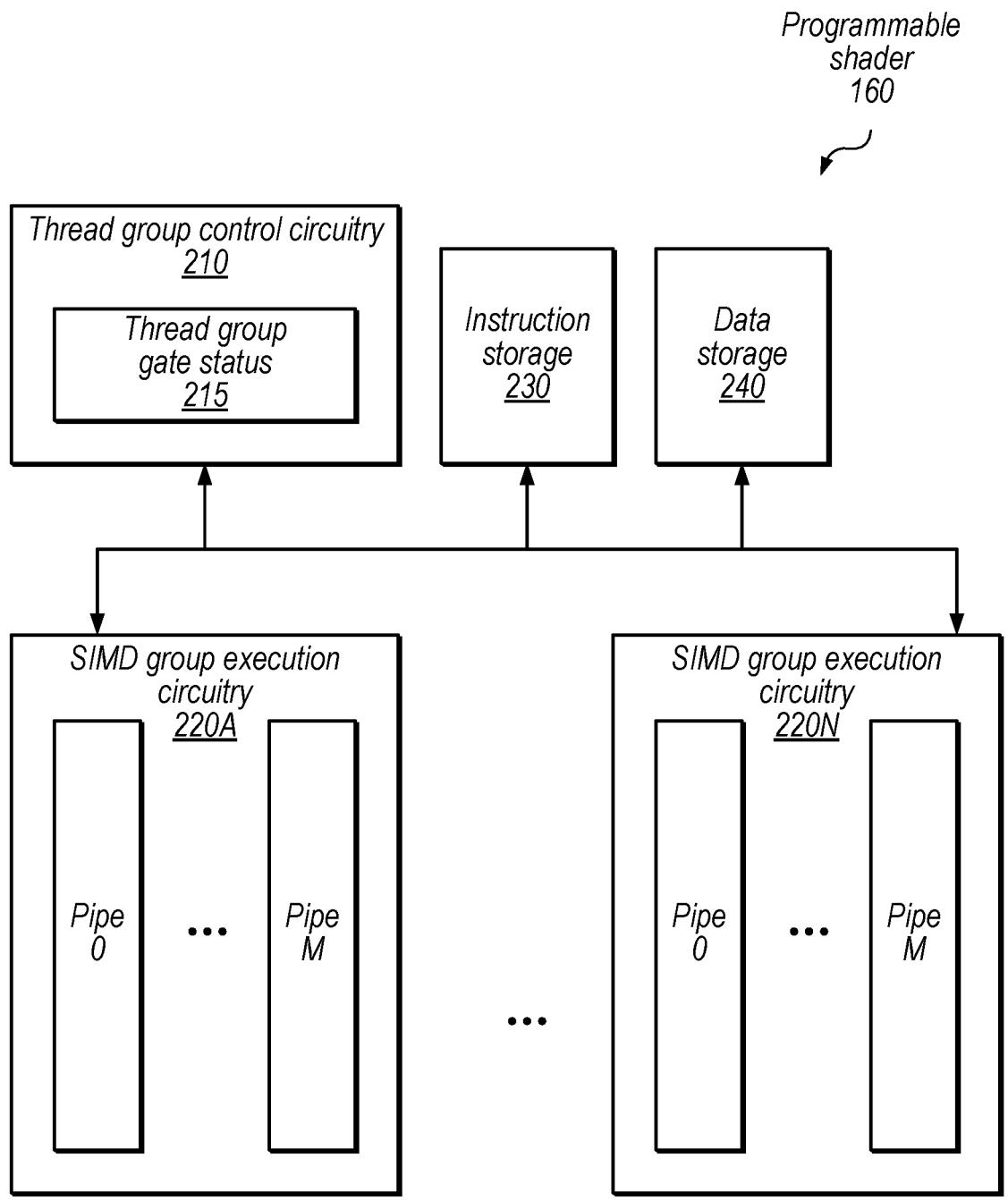
FIG. 2 is a block diagram illustrating example processor circuitry configured to execute a thread group, according to some embodiments.

FIG. 2 is a block diagram illustrating example processor circuitry configured to execute a thread group, according to some embodiments. In the illustrated example, the processor includes thread group control circuitry 210, multiple sets of SIMD group execution circuitry 220A-220N, instruction storage 230, and data storage 240. The circuitry of FIG. 2 is included for purposes of explanation, but is not intended to limit the scope of the present disclosure. Various parallel processing architectures may be implemented in other embodiments.

Thread group control circuitry 210, in the illustrated embodiment, is configured to control execution of a currently-assigned thread group. Once execution of one thread group is complete, the processor may assign another thread group to circuitry 210. In some embodiments, the processor includes multiple thread group control circuits configured to execute multiple thread groups at least partially in parallel.

Thread group gate status 215, in the illustrated embodiment, indicates whether a threshold number of SIMD groups in the thread group have reached a gate instruction. In some embodiments, thread group control circuitry 210 includes a hardware register configured to store the gate status 215. In some embodiments, each thread group is assigned a dedicated register to store its gate status when it is launched. In other embodiments, thread group control circuitry 210 may store the status using other structures, such as at an addressable memory location, for example.

The term "SIMD group" is intended to be interpreted according to its well-understood meaning, which includes a set of threads for which processing hardware processes the same instruction in parallel using different input data for the different threads. Various types of computer processors may include sets of pipelines configured to execute SIMD instructions. For example, graphics processors often include programmable shader cores that are configured to execute instructions for a set of related threads in a SIMD fashion. Other examples of names often used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

Each set of SIMD group execution circuitry 220, in the illustrated embodiment, is configured to execute a program for a currently-assigned SIMD group. In the illustrated embodiment, SIMD group execution circuitry includes M+1 pipelines configured to execute different threads in the SIMD group in parallel. Each pipeline may include multiple stages. Execution circuitry 220 may implement predicated execution within a SIMD group to handle control transfer.

If the number of SIMD groups in the thread group is larger than the number of sets of SIMD group execution circuitry 220, a remaining SIMD group may be assigned to a set of execution circuitry 220 when it has finished processing an initially-assigned SIMD group. Further, SIMD group execution circuitry 220 may be shared among different thread group control circuitry. Thus, a set of SIMD group execution circuitry 220A may be assigned SIMD groups from different thread groups.

In some embodiments, each time a SIMD group reaches a gate instruction, the corresponding execution circuitry 220 notifies the thread group control circuitry 210 and accesses the thread group gate status 215. Thread group control circuitry 210 may update the status if needed. Depending on the thread group gate status 215, the SIMD group may take a different path through the program being executed. This may allow the first N SIMD groups that reach a gate instruction to perform one or more operations for an entire thread group, where N is an integer greater than zero.

Instruction storage 230 is configured to store SIMD instructions and data storage 240 is configured to store operands for different threads, in the illustrated embodiment.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction and/or operations associated with the instruction on to other stages for further processing.

As background regarding control transfer operations, for a given program or portion of a program, flow typically proceeds in a sequential fashion. Consider the following group of instructions: ld mem1→r1; add r1, r2→r3; st r3→mem2. In this exemplary sequence, execution and completion proceeds sequentially from the load instruction to the add instruction to the store instruction. This sequential ordering can be considered the program flow default. In this example, none of these instructions affects the selection of the next instruction to be executed and completed (beyond the default behavior).

In contrast, the execution and completion of instructions with certain opcodes potentially affects the selection of the next instruction to be executed and completed. These instructions are referred to herein as "control transfer instructions." Control transfer instructions may include, without limitation, branches, jumps, calls, returns, etc. Instructions of these types can cause a change in the default behavior of the next instruction to be executed and completed. Control transfer instructions may be used, for example, to execute a loop of instructions.

There may also be many different types of control transfer instructions. For example, control transfer instructions may operate conditionally (i.e., setting the program counter based on whether some condition is true or false) or unconditionally. Similarly, certain control transfer instructions may specify direct target addresses; other control transfer instructions may specify indirect target addresses. Note that the execution and completion of control transfer instructions may have effects on processor state other than on the location of the next instruction (e.g., there might be an instruction that branches after performing an arithmetic operation).

Example Gate Instruction Execution

Figure 3:
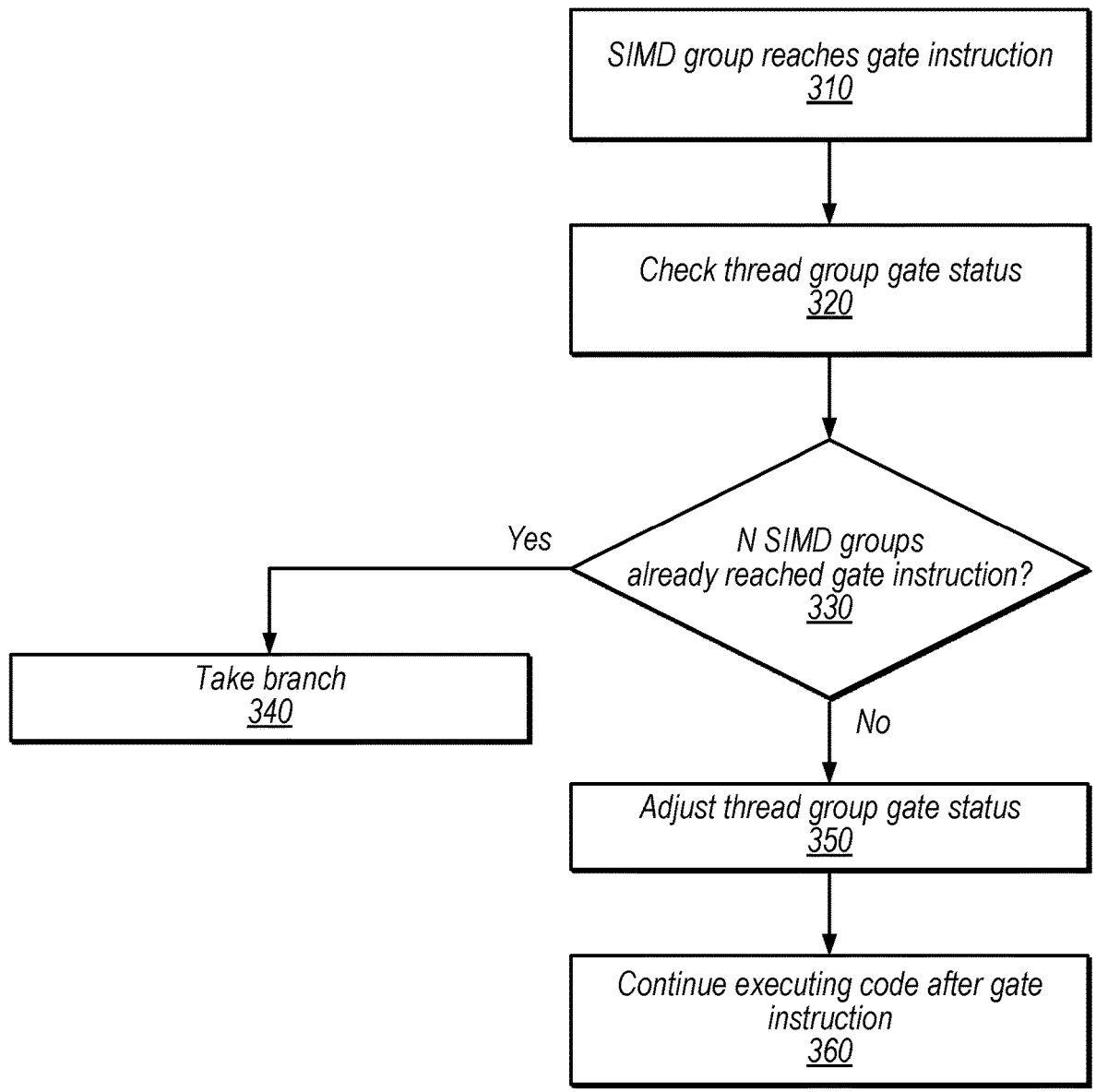
FIG. 3 is a flow diagram illustrating an example technique for executing a thread-group-scoped gate instruction, according to some embodiments.

FIG. 3 is a flow diagram illustrating an example technique for executing a thread-group-scoped gate instruction, according to some embodiments. The method shown in FIG. 3 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 310, in the illustrated example, a SIMD group reaches a gate instruction. The gate instruction may include an opcode field that indicates the nature of the instruction. The gate instruction also may include one or more fields that indicate a branch target address. In embodiments in which the number of SIMD groups N is allowed to be greater than one, the gate instruction may indicate the value of N.

At 320, in the processor checks the thread group gate status maintained by thread group control circuitry 210. In some embodiments, the processor includes circuitry configured to check and update the thread group gate status atomically, such that the check does not interfere with checks by other SIMD groups.

At 330, if N SIMD groups have already reached the gate instruction, the SIMD groups takes a branch at 340. This may allow the SIMD group to skip a portion of the program that is to be executed by the first N SIMD groups that reach the gate instruction, for example.

Alternatively, if the SIMD group is within the first N SIMD groups to reach the gate instruction at 330, the thread group control circuitry 210 adjusts the thread group gate status at 350. For example, the processor may increment the status. The status may have various encodings in various embodiments. For example, the status may be a binary field for embodiments in which N is one, a counter in embodiments in which N is greater than one (and various counter formats and directions may be implemented), a separate binary field and counter, etc.

In some embodiments, the threshold number is determined based on the number of parallel threads that facilitate execution of a utility program for the thread group. Therefore, in some embodiments, the threshold is programmable by the graphics program itself. In these embodiments, thread group control circuitry 210 may maintain a register to store the threshold number, another register to store a count of SIMD groups in the thread group that have reached the gate instruction, and compare circuitry configured to determine whether the threshold number has been reached.

At 360, in the illustrated example, the SIMD group continues executing code after the gate instruction. This code may be a utility program that performs one or more operations for the entire thread group, but is only executed by the first N SIMD groups. For example, the first N SIMD groups may save thread-group-scoped context information for the thread group in a context switch situation where the thread group is being switched out and needs to save its state. In this example, all threads may execute code to save their SIMD-group-scoped and thread-scoped state (e.g., by executing the instructions after the branch) but only the first N threads may be used to save thread-group-scoped state (e.g., by executing the instructions between the gate instruction and the branch target).

In some embodiments, the SIMD groups that take the branch and the other SIMD groups may eventually synchronize at a barrier instruction and the processor may clear the thread group gate status at this point. In some embodiments, the processor supports multiple types of barrier operations. Some types of barrier operations may clear the thread group gate status while others may not. Whether a barrier clears the thread group gate status may be indicated by the opcode of the barrier instruction or another field included in the barrier instruction, for example.

Note that the illustrated technique (in which the first N SIMD groups do not take a control transfer and the other SIMD groups take the control transfer) is provided for purposes of illustration but is not intended to limit the scope of the present disclosure. For example, in other embodiments, the first N SIMD groups may take a branch while the remaining SIMD groups may not take the branch or may take a different branch. Speaking generally, in various embodiments, the first N SIMD groups to reach the gate instruction may execute a portion of a program that is not executed by other SIMD groups in the thread group.

Figure 4:
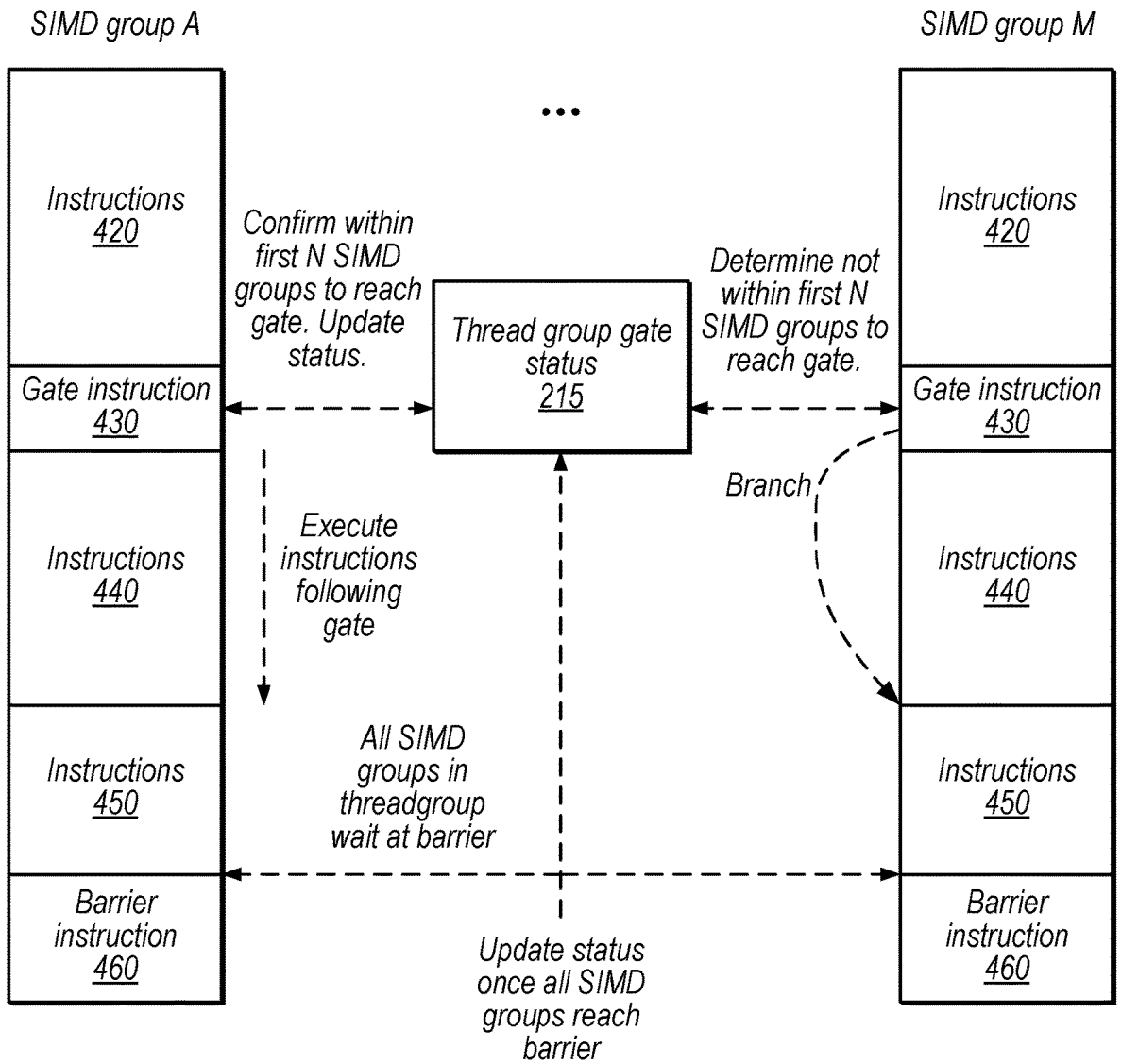
FIG. 4 is a diagram illustrating an example program executed by multiple different SIMD groups, according to some embodiments.

FIG. 4 is a diagram illustrating an example program executed by multiple different SIMD groups, according to some embodiments. In the illustrated example, the program includes a gate instruction 430, a barrier instruction 460, and additional sets of instructions 420, 440, and 450. This program is executed by SIMD groups A and M, in the illustrated example. Note, however, that the thread group that includes these two SIMD groups may include a number of additional SIMD groups that are not shown.

In the illustrated example, SIMD group A reaches gate instruction 430 before SIMD group M. Further, SIMD group A is among the first N SIMD groups to reach the gate and SIMD group M is not.

When SIMD group A reaches the gate instruction 430, in the illustrated example, it accesses thread group gate status 215 to determine that it is within the first N SIMD groups to reach the gate and then updates the gate status 215. For example, if N is one, SIMD group A may determine whether the thread group gate status is "false" and change the status to "true" if so. If N is greater than one, SIMD group A may read and increment (or decrement) a counter value. In some embodiments, SIMD group A performs an atomic compare-and-swap operation to read and update the thread group gate status, which may ensure an accurate value when multiple SIMD groups attempt to access the gate status 215.

The processor may include various circuitry controlled by the thread group gate status 215. For example, the processor may include circuitry configured to compare the thread group gate status with one or more threshold values. More generally, the processor may include logic circuitry that uses the thread group gate status as an input to control the decision of element 330, discussed below. For example, if the thread group gate status is a single bit, that bit may control a multiplexer to select from among multiple options for the address of the next instruction executed for the SIMD group.

Because SIMD group A is within the first N threads, it does not take the control transfer associate with gate instruction 430, but instead executes instructions 440 following gate instruction 430. SIMD group A then executes instructions 450 and eventually arrives at barrier instruction 460, which may be thread-group-scoped such that all threads in the thread group must reach the barrier instruction 460 before any threads are allowed to proceed.

In contrast, when SIMD group M reaches gate instruction 430 it is not within the first N SIMD groups to reach the gate and it takes a control transfer (a branch, in this example) to instructions 450 and eventually reaches barrier instruction 460. In the illustrated example, when all SIMD groups in the thread group have reached the barrier, thread group control circuitry 210 updates the thread group gate status (e.g., to set the value to false, to set a count to zero, to set a count to N–1, etc.).

Note that SIMD group A may not execute instructions 450 in other examples. For example, instructions 440 may end with a control transfer instruction that targets barrier instruction 460. In these embodiments, SIMD groups A and N may execute completely non-overlapping code portions between reaching the gate instruction 430 and reaching the barrier instruction 460. Further, as discussed above, SIMD group A may branch to instructions 450 upon determining that it is within the first N SIMD groups while SIMD group N may not branch in response to determining that it is within the first N SIMD groups. In these examples, the first N SIMD groups to reach the gate may not perform one or more operations that are performed by the remaining SIMD groups in the thread group.

In some embodiments, all SIMD groups that execute a gate instruction should eventually arrive at the same barrier so that the thread group gate status 215 can be appropriately reset, e.g., to allow its user for a subsequent gate instruction.

In some embodiments, instructions 440 specify saving of thread group state while instructions 450 specify saving of SIMD group state, thread state, or both.

Example Method

Figure 5:
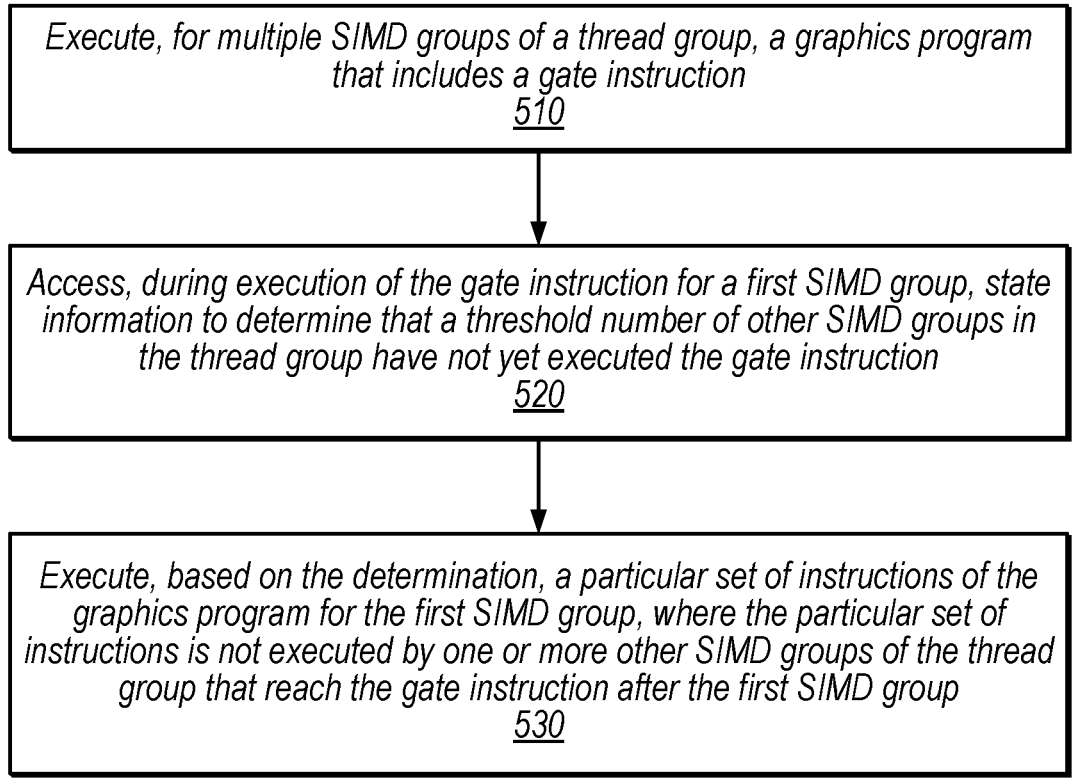
FIG. 5 is a flow diagram illustrating an example method for executing a gate instruction, according to some embodiments.

FIG. 5 is a flow diagram illustrating an example method for executing a gate instruction, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, graphics processor circuitry (e.g., SIMD group execution circuitry 220) executes, for multiple SIMD groups of a thread group, a graphics program that includes a gate instruction.

At 520, in the illustrated embodiment, graphics processor circuitry (e.g., thread group control circuitry 210) accesses, during execution of the gate instruction for a first SIMD group, state information to determine that a threshold number of other SIMD groups in the thread group have not yet executed the gate instruction. The processor may access and adjust the state information atomically to indicate that the first SIMD group has executed the gate instruction. In some embodiments, the threshold number is one. In some embodiments, the apparatus is configured to adjust the threshold number of other SIMD groups based on an instruction in the graphics program. For example, the graphics program may include an instruction that specifies the number of SIMD groups in a thread group that are to execute a utility program.

At 530, in the illustrated embodiment, graphics processor circuitry executes, based on the determination, a particular set of instructions of the graphics program for the first SIMD group, where the particular set of instructions is not executed by one or more other SIMD groups of the thread group that reach the gate instruction after the first SIMD group.

In some embodiments, the processor waits to proceed past a barrier instruction in the graphics program until all SIMD groups in the thread group have reached the barrier instruction and resets the state information in response to determining that all SIMD groups in the thread group have reached the barrier instruction.

In some embodiments, the particular set of instructions is a utility program that performs one or more operations for the entire thread group but is only executed by a subset of the SIMD groups. For example, in some embodiments, the particular set of instructions is a preemption handler that stores thread-group-scoped architectural state information for a context switch. In some embodiments, all SIMD groups in the thread group may execute another portion of the graphics program that stores SIMD-group-scoped state information for a context switch.

In some embodiments, the processor executes a next instruction following the gate instruction for the first SIMD group based on the determination and transfers control (e.g., branches) to another portion of the graphics program for a second SIMD group based on execution of the gating instruction for the second SIMD group and a determination that the threshold number of other SIMD groups in the thread group have already executed the gate instruction.

Example Device

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 150, and display unit 665. In some embodiments, device 600 may include other components (not shown) in addition to and/or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 150 may be described as "coupled to" a memory through fabric 610 and cache/memory controller 645. In contrast, in the illustrated embodiment of FIG. 6, graphics unit 150 is "directly coupled" to fabric 610 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. Programmable shader 160, in various embodiments, may include highly parallel execution cores configured to execute graphics programs, which may include pixel tasks, vertex tasks, and compute tasks (which may or may not be graphics-related).

In some embodiments, graphics unit 150 includes the circuitry discussed herein. In other embodiments, the disclosed circuitry may be implemented in other types of processors, such as CPUs, for example.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 600 with connectivity to various types of other devices and networks.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 7 is a block diagram illustrating an example non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1B, 2, and 4. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
graphics processor circuitry configured to:
execute, for multiple single-instruction multiple-data (SIMD) groups of a thread group, a graphics program that includes a gate instruction;
during execution of the gate instruction for a first SIMD group, access state information to determine that a threshold number of other SIMD groups in the thread group have not yet executed the gate instruction;
based on the determination, execute a particular set of instructions of the graphics program for the first SIMD group, wherein the particular set of instructions is not executed by one or more other SIMD groups of the thread group that reach the gate instruction after the first SIMD group.

2. The apparatus of claim 1, wherein the particular set of instructions is a preemption handler that stores thread-group-scoped architectural state information for a context switch.

3. The apparatus of claim 1, wherein the particular set of instructions is a utility program that performs one or more operations for the entire thread group but is only executed by a subset of the SIMD groups.

4. The apparatus of claim 1, wherein the graphics processor circuitry is further configured to access and adjust the state information atomically to indicate that the first SIMD group has executed the gate instruction.

5. The apparatus of claim 1, wherein the graphics processor circuitry is further configured to:
   wait to proceed past a barrier instruction in the graphics program until all SIMD groups in the thread group have reached the barrier instruction; and
   reset, in response to determining that all SIMD groups in the thread group have reached the barrier instruction, the state information that indicates whether a threshold number of other SIMD groups in the thread group have executed the gate instruction.

6. The apparatus of claim 1, wherein the graphics processor circuitry is further configured to execute a next instruction following the gate instruction for the first SIMD group based on the determination; and
   wherein the graphics processor circuitry is further configured to branch to another portion of the graphics program for a second SIMD group based on execution of the gating instruction for the second SIMD group and a determination that the threshold number of other SIMD groups in the thread group have already executed the gate instruction.

7. The apparatus of claim 5, wherein the other portion of the graphics program is a preemption handler that stores SIMD-group-scoped state information for a context switch.

8. The apparatus of claim 1, wherein the threshold number is one.

9. The apparatus of claim 1, wherein the graphics processor circuitry is configured to store the state information in a hardware register configured to store state information for a currently-assigned thread group.

10. The apparatus of claim 1, wherein the apparatus is configured to adjust the threshold number of other SIMD groups based on an instruction in the graphics program.

11. A method, comprising:
    executing, by graphics processor circuitry for multiple SIMD groups of a thread group, a graphics program that includes a gate instruction;
    accessing, by the graphics processor circuitry during execution of the gate instruction for a first SIMD group, state information to determine that a threshold number of other SIMD groups in the thread group have not yet executed the gate instruction;
    executing, by the graphics processing circuitry based on the determination, a particular set of instructions of the graphics program for the first SIMD group, wherein the particular set of instructions is not executed by one or more other SIMD groups of the thread group that reach the gate instruction after the first SIMD group.

12. The method of claim 11, further comprising:
    updating, by the graphics processor circuitry, the state information based on the first SIMD group reaching the gate instruction;
    wherein the accessing and updating are performed atomically.

13. The method of claim 11, further comprising:
    waiting, by the graphics processor circuitry, to proceed past a barrier instruction in the graphics program until all SIMD groups in the thread group have reached the barrier instruction; and
    resetting, by the graphics processor circuitry, the state information in response to all SIMD groups in the thread group reaching the barrier instruction.

14. The method of claim 11, further comprising:
    executing a next instruction following the gate instruction for the first SIMD group based on the determination; and
    branching to another portion of the graphics program for a second SIMD group based on executing the gating instruction for the second SIMD group and determining that the threshold number of other SIMD groups in the thread group have already executed the gate instruction.

15. A non-transitory computer-readable medium having instructions stored thereon that are executable by a computing device to perform operations comprising:
    executing, by for multiple SIMD groups of a thread group, a gate instruction included in a graphics program specified by the instructions;
    accessing, during execution of the gate instruction for a first SIMD group, state information to determine that a threshold number of other SIMD groups in the thread group have not yet executed the gate instruction;
    executing, based on the determination, a particular set of instructions of the graphics program for the first SIMD group, wherein the particular set of instructions is not executed by one or more other SIMD groups of the thread group that reach the gate instruction after the first SIMD group.

16. The non-transitory computer-readable medium of claim 15, wherein the particular set of instructions is a preemption handler that stores thread-group-scoped architectural state information for a context switch.

17. The non-transitory computer-readable medium of claim 15, wherein the particular set of instructions is a utility program that performs one or more operations for the entire thread group but is only executed by a subset of the SIMD groups.

18. The non-transitory computer-readable medium of claim 15, wherein the operations further comprise:
    updating the state information based on the first SIMD group reaching the gate instruction;
    wherein the accessing and updating are performed atomically.

19. The non-transitory computer-readable medium of claim 15, wherein operations further comprise:
    waiting to proceed past a barrier instruction in the graphics program until all SIMD groups in the thread group have reached the barrier instruction; and
    resetting the state information in response to all SIMD groups in the thread group reaching the barrier instruction.

20. The non-transitory computer-readable medium of claim 15, wherein the operations further comprise:
    executing a next instruction following the gate instruction for the first SIMD group based on the determination; and
    branching to another portion of the graphics program for a second SIMD group based on executing the gating instruction for the second SIMD group and determining that the threshold number of other SIMD groups in the thread group have already executed the gate instruction.

* * * * *